United States Patent Office 3,433,875
Patented Mar. 18, 1969

3,433,875
THE IMPROVEMENT OF MENTAL PERFORM-
ANCE WITH POTASSIUM N-ACETYL DL
AMINOSUCCINATE
Jean Cahn, 18 Rue J.M. de Heredia, Paris, and Jean-
Claude Denis, 15 Rue Mathurin Regnier, Paris, France
No Drawing. Continuation-in-part of application Ser. No.
436,644, Mar. 2, 1965. This application Nov. 6, 1967,
Ser. No. 681,003
Claims priority, application France, Mar. 26, 1964,
968,815
U.S. Cl. 424—319  3 Claims
Int. Cl. A61k 27/00

ABSTRACT OF THE DISCLOSURE

Mental performance in humans is improved by the administration of pharmaceutical compositions containing potassium N-acetyl DL aminosuccinate.

---

This application is a continuation-in-part of application Ser. No. 436,644 filed Mar. 2, 1965, now abandoned.

BACKGROUND OF THE INVENTION

The present invention relates to a method for improving the mental performance of humans.

Aging individuals frequently experience problems associated wth psychic aging. Among these problems are troubles of adaptation and behavior, anxieties, troubles of sleep and general intellectual deficiencies. Thus, elderly people often have difficulty in adapting themselves to any new situation and are sometimes hostile or withdrawn. Also, aging individuals tend to be anxious even about minor problems and often complain of inability to sleep.

Problems connected with anxiety and minor neuroses are actually rather common throughout modern adult life. Situations such as a recent change in environment, in work or in marital situation often induce psychosomatic syndroms which include a state of minor anxiety, troubles of sleep and a progressive inaptitude for study and work, particularly work of an intellectual nature.

SUMMARY OF THE INVENTION

It is a primary object of this invention to provide a method for treating humans which improves their mental performance.

This object has been fulfilled by the discovery that the mental performance of humans is improved by the administration of an effective amount of a pharmaceutical composition containing as an active substance pharmaceutically acceptable salts of N-acetyl DL aminosuccinate. The N-acetylaminosuccinate salt may be a racemic mixture or the levorotatory form.

DESCRIPTION OF THE PREFERRED EMBODIMENTS

According to this invention, the preferred compound is potassium N-acetyl DL aminosuccinate having the formula:

Potassium N-acetyl aminosuccinate may be administered to adults, particularly adults suffering from intellectual overwork and from diseases involving memory and ideation capacity and to old people, particularly those suffering from intellectual diseases due to senescence.

A convenient method of administering potassium N-acetyl DL aminosuccinate is in the form of a drinkable ampulla which contains the active substance in the form of an aqueous solution. The potassium N-acetyl DL aminosuccinate can be used alone or in association with other medicinal substances.

The therapeutical useful dose of potassium N-acetyl aminosuccinate varies from 0.250 g. to 1 g. and may be administered in several fractions.

EXAMPLE 1.—Preparation of potassium N-acetyl DL aminosuccinate (a) Preparation of N-acetyl DL aminosuccinic acid 25 cc. of acetic anhydride are added to a 5-gram solution of DL aminosuccinic acid in 100 cc. of boiling water. The mixture is rapidly cooled to room temperature in an ice bath. Then 75 cc. of acetic anhydride are added and the product is stirred during 6 hours while maintaining same at room temperature by using adequate cooling means. The solvent is subsequently evaporated under 11 mm. of Hg to obtain a high-viscosity sirup.

(b) Preparation of N-acetyl DL aminosuccinic anhydride

The sirup obtained as per (a) hereinabove is heated for a period of 20 minutes with 30 cc. of acetic anhydride. The mixture is concentrated to half its initial volume under 11 mm. of Hg, then cooled in an ice bath for one hour. The crystallized N-acetyl DL aminosuccinic anhydride is freed of its excess water on a Buchner filter, then washed with acetic anhydride, subsequently with ethyl acetate and finally with light kerosene. Its melting point is 143–144° C. The product is recrystallized in the hot state in acetic anhydride and washed as set forth hereinabove. The melting point is stable at 144° C. The product is hygroscopic and must be preserved in vacuo.

(c) Preparation of potassium N-acetyl DL aminosuccinate solution

To obtain a 40% solution 25-grams of N-acetyl DL aminosuccinic anhydride are weighed and dissolved in 60 cc. of distilled water. Small fractions consisting each of 31.85 grams of potassium bicarbonate are added while stirring to avoid the formation of foams. The product is then adjusted to 100 cc. with distilled water.

The solution is subsequently degassed in vacuo. The potassium N-acetyl aminosuccinate $C_6H_7O_5NK_2$ (molecular weight=251.2) does not crystallize and is hygroscopic, this last property accounting for its method of preparation directly as a solution.

EXAMPLE 2.—Pharmacological properties of potassium N-acetyl DL aminosuccinate (1) Animal toxicology LD 50 (S.C. route) in mice is 2,700 mg./kg. in the male and 3,000 mg./kg. in the female. LD 50 in rats (oral route) is 5,563 mg./kg. in the male and 4,032 mg./kg. in the female.

In male and female rats a 3 months' oral administration of daily doses representing $\frac{1}{100}$ to $\frac{1}{10}$ of the LD 50 did not show any pathological changes in the blood cells count, in the body weight gain. Histological examination of various organs did not show any cytological injury. Gastric tolerance was good.

A month administration of 500 mg./kg. daily in the rabbit (oral route) confirmed those findings.

Potassium N-acetyl DL aminosuccinate did not produce any teratologic effects on new born rats. Female rats received orally 20 and 400 mg./kg. during the 2 first weeks of pregnancy.

(2) Pharmacodynamics in animals (a) Effects on psychomotive behavior.—In the male rat, by the intraperitoneal route, with doses ranging from 5 to 250 mg./kg., potassium N-acetyl aminosuccinate produces an increase in the interest and the exploration activity at all doses; this effect appears to be more evident after a per os absorption. Motility is retarded during a first phase in conjunction with a slowing up of the reflex when pulling up the bar. In a second phase, on the contrary, the motility is accelerated. The response to nociceptive stimulations is always very fast. It is frequently attended by an aggressiveness proportional to the administered dose. These effects last in the average five hours.

(b) Action of potassium N-acetyl aminosuccinate on ammonium chloride intoxication of rates At doses of 1.5 and 3 grams/kg., potassium N-acetyl aminosuccinate provides an unquestionable protection against the injection of ammonium chloride in 6% or 4% solution and at the dose of 3 per 100 grams of live weight; it extends the time of appearance of respiratory and heart stoppages, but in addition potassium N-acetyl aminosuccinate eliminates tonic convulsions normally caused by ammonium chloride. Potassium aminosuccinate taken at equivalent doses cannot provide a similar protection against the central effects of ammonium chloride.

Therefore, central effects of potassium N-acetyl aminosuccinate are very definite. They are ascribable to the presence, in a large number of cerebral structures, of this type of aminosuccinic acid which seems to constitute a form of stocking with a concentration varying, as a gradual increment, with growth and under the influence of psychotropic agents such as chloropromazine (decrease) or amphetamine (increase).

In the N-acetylated form, potassium aminosuccinate appears to constitute a metabolic factor effective in the regulation of cerebral activity.

EXAMPLE 3.—Pharmaceutical preparation

Potassium N-acetyl aminosuccinate may be used in solution having a suitable pharmaceutical appearance, for example in drinkable ampulla, either alone or associated with other medicinal substances, as in the following formula:

| | Grams |
|---|---|
| Potassium N-acetyl aminosuccinate | 0.250 |
| Levulose | 1 |

Water, balance to make a 10 cc. ampoule.

Levorotatory N-acetyl aminosuccinic acid and its salts are prepared in the same manner as racemic compounds but from l-aminosuccinic acid and have equivalent pharmacological properties.

EXAMPLE 4.—A clinical study

The clinical activity of potassium N-acetyl DL aminosuccinic acid was studied in 47 subjects. The study was conducted in three groups. A first group of 14 normal subjects who work in a variety of professions; a second group of 20 voluntary medical students and a third group of 13 different persons with subjective syndrom after cranial traumatism. The third group suffered from headaches, vertigoes, ill temper, troubles of sleep, memorization or attention. To each of these individuals was prescribed potassium acetyl aminosuccinate, as the posology of two ampoules daily (morning an devening) during 8 days. Each ampoule contained 0.250 g. of potassium N-acetyl DL aminosuccinate, 1.0 g. levulose and distilled water to make a 10 cc. ampoule. Although in all cases, the active compound was given, all subjects were told that certain might have a placebo. Each individual was subjected, before and after the treatment, to a complete clinical and psychological questioning and examination.

The psychologic tests employed were: Test of vocabulary of Binoit-Pichot (intellectual verbal level), measure of the psychomotive reaction time, level of aspiration, and mental computation, test of anxiety (Cattell), and MMPI (Minnesota Multiphasis Investigation).

The clinical questionary related to: Sleep (length, quality, awakening); facilitation of intellectual activity, memorization, attention, concentration; temper; and tolerance.

The results are sumarized in Table 1.

TABLE 1

| Improvement with respect to— | Group I | Group II | Group III |
|---|---|---|---|
| Intellectual efficiency (I.E). | 14 cases on 14 tests, 100%. | 19 cases on 20 tests, 95%. | 10 cases on 13 tests, 76%. |
| Temper | 10 cases on 14 tests, 71%. | 16 cases on 20 tests, 70%. | 6 cases on 11 tests, 54%.* |
| Sleep | 13 cases on 14 tests, 92%. | 10 case on 20 tests, 50%. | 12 cases on 13 tests, 92%. |

*2 patients had no headaches before treatment.

Conclusion

The activity of potassium N-acetyl aminosuccinate was studied in 47 subjects, of whom 34 were normal and 13 had a subjective syndrom of cranial traumatism. The compound seemed to have a soft, progressive activity on intellectual functions, humor and sleep. It seems to permit individuals to function with full potency, with respect to both their intellectual and their psychomotive faculties to be optimistic, and to get better sleep. The tolerance was very good in all cases.

EXAMPLE 5.—Clinical study

Thirty six elderly people were studied, 20 women and 16 men ranging in age from 63 to 94 years old, of these, 7 individuals suffered from severe psychiatric disorders, i.e. melancholy (1), senile demence (3), maniaco depressive (2), and chronic delirium of persecution (1). Each subject was treated orally with two doses daily (one in the morning and one in the evening) for three weeks with potassium N-acetyl DL aminosuccinate in the form of "Cogitum" an ampoule containing 0.250 g. of potassium N-acetyl DL aminosuccinate, 1.00 g. of levulose and distilled water to make a 10 cc. ampoule.

The effect of the treatment on four types of problems found most often in elderly patients was determined. These problems are troubles of adaptation and behaviour, anxiety, troubles of sleep, and intellectual deficiency. Troubles of adaptation and behaviour, are of the greatest importance in ordinary life, for promiscuousness in elderly individuals is often unpleasant; such troubles include hostility of old men, who want to fight, with fists, and the withdrawal of others who remain motionless and silent. Changes in behaviour of the subjects of this study towards physicians, towards the nurses and towards other patients were carefully observed. An old patient is anxious, often for his health, even if it is good or for the material organization of his life and any change in problems of anxiety were carefully noted during this study. The troubles of sleep, including insomnia and any improvement determined by observation and questioning of each patient. Intellectual deficiency and improvement thereof was determined by studying the curiosity of the subjects towards other patients, and the curiosity and realization of actuality; and by studying the need of each subject for reading (newspaper, books, reviews), of listening to the radio, and of speaking with their friends or nurses. The seven severely psychotic patients were not improved by the potassium N-acetyl aminosuccinate. This was previsible, and it was only to check more fully the possibilities afforded by the medicament that we tested it with these psychotic patients. The results of observations of the remaining 29 subjects are set forth in Table 2.

TABLE 2

|  | No improvement | Good results | Very good results | Percent of improvement |
|---|---|---|---|---|
| Troubles of adaptation | 6 | 14 | 9 | 79 |
| Anxiety | 7 | 12 | 3 | 75 |
| Sleep | 13 | 6 | 3 | 40 |
| Intellectual deficiency | 17 | 10 | 2 | 41 |

No signs of intolerance, gastric, psychic or general were observed.

Conclusion

The activity of the compound with respect to troubles of adaptation and anxiety is indisputable. While the drug does not have any activity on severely psychotic patients, it seems to have a remarkable efficiency on nervotic troubles of the character frequently found in old people. This is very important, and this compound is definitely beneficial in the treatment of such disorders.

EXAMPLE 6.—Clinical study

Potassium N-acetyl DL aminosuccinate has been prescribed to 35 deaf men, from 4 to 84 years old, of whom 25 had a pure perception deafness and 10, a mixed deafness. The dose was 2 ampoules daily (morning and evening) during periods from 10 to 120 days. The ampoule was in the form of a drinkable composition and contained:

|  | G. |
|---|---|
| Potassium acetyl aminosuccinate | 0.250 |
| Levulose | 1.000 |

Banana aromatized distilled water q.s.p. for an ampoule of 10 ml.

In each case, before and after treatment, a complete clinical and audiometric examination was made. The results, are based on the following evaluation:

*Excellent* when the amelioration is striking; not only pointed out by the deaf man or his family, but ascertained by tonal and vocal audiometry (4 cases).

*Very good* when the amelioration is emphasized by the deaf man or his family but confirmed only by vocal audiometry (8 cases).

*Good* when associated with reeducation, the compound has facilitated and shortened the time required therefor.

*Poor* when no activity was noted.

It is important to note that no intolerance or side effects appeared, either during or after the treatment.

Among those suffering from perceptical deafness, excellent results were obtained with four individuals, very good results were obtained with seven individuals, good results were obtained with 12 individuals and with 2 individuals poor results were obtained.

In cases of mixed deafness, one individual obtained very good results, seven individuals had good results and two individuals had poor results.

In Table 3 is summarized the effect of the treatment on troubles associated with deafness.

TABLE 3

| Nature of trouble | Results | |
|---|---|---|
|  | Number of individuals suffering from disorder | Number of individuals obtaining amelioration |
| Acouphens | 14 | 4 |
| Vertigo | 4 | 1 |
| Insomny | 9 | 9 |
| Anxiety | 12 | 10 |
| Hardship | 6 | 6 |

According to the observations made, the best indications seem to be:

Presbyacousy; the amelioration concerns the subjective impression of the deaf man; vocal (and even tonal) audiometry.

Deafness by acoustic traumatism, and even streptomycin intoxication.

Certain child deafness, with (or without) dyslexy, dysorthography.

Certain non-operable otosclerosis (or after surgical check).

Auditory reeducation, in which, in almost all cases, good results have been noted.

Lastly, among the good cases were included deaf mean who did not benefit from an auditory prothesis before treatment and did after treatment.

Conclusion

Thirty-five deaf men have been treated with potassium N-acetyl aminosuccinate. While this compound is not able to heal all the perceptive and mixed deafness, it seems to be very interesting, and more active than all other medication prescribed hitherto.

EXAMPLE 7.—Clinical study

Two ampoules daily of potassium N-acetylaminosuccinate was prescribed to patients (one in the morning, the other in the evening) during ten days, but in some cases, the treatment was continued longer, up to 25 days. Each ampoule contained

|  | G. |
|---|---|
| Potassium N-acetylaminosuccinate | 0.250 |
| Levulose | 1.000 |

Excipient for 10 ml.

The activity of potassium N-acetylaminosuccinate was measured by clinical interrogation and examination and is based on the following evaluation:

Very good, when the subject's complaints disappeared completely.

Good, when it decreased strikingly.

Middle, when there was a little amelioration.

Poor, when no activity was noted.

The tolerance has always been very good, from a psychic as well as from a somatic point of view. In several cases, a biological check up was made, before and after treatment.

Thirteen subjects had neurovegetative dystonies, with the usual cortege of functional complaints and insomnia. The results for these subjects included generally better psychic equilibrium and better sleep; for 3 individuals very good results were obtained, for 4 individuals good results were obtained, for 4 individuals medium results were obtained and for 2 individuals poor results were obtained.

Eleven subjects has psychic astheny, often with a maximum in the morning; this trouble was not related to an organic disease but was a severe hinderance for the subjects. Three subjects had very good results, four subjects had good results, and four subjects had medium results and the sleep, normal at the beginning of the treatment, remained normal.

Four subjects had intellectual hardship caused by overwork, and insomnia. In one case, the subject had previously had depressive tendency. In these four observations, two very good results and two good results were observed.

Five elderly (68–77 years old) subjects, with depressive tendency and in 3 cases a slight mental senile deterioration, were treated with one very good result, two medium results and two poor results.

A unique case of pithiatism, with ancient psychic troubles, has not been influenced by the treatment.

A single case of a subject with mental anorexia was treated and an absence of efficacy of the treatment was observed.

The tolerance has been excellent in all cases. The compound has a good taste, and was absorbed without difficulty; and no manifestation of gastric, intestinal or psychosomatic intolerance was observed. In ten cases, a biological check up was made, with hemogram sedimentation, hepatic screening, ionogram, dosages of glycemy and urea, research of glucose and albumine in urines, before and after treatment; no sign of toxicity was found.

The results are generally good. Inconstants in senile psychic troubles, they are excellent in intellectual hardship, and good in neurogenic dystony and astheny; the functional manifestations decrease, or disappear, as well as anxiety; sleep is better. Potassium N-acetylaminosuccinate cannot be prescribed in serious psychiatric diseases, but its excellent tolerance and its good efficacy are useful in the treatment of the psychic troubles often observed by general practitioners.

Thus an efficacious method of improving the general mental performance of humans has been provided. Treatment for a few days of adults suffering from overwork, with one ampoule containing 0.250 g. of potassium N-acetylaminosuccinate at night, another in the morning and an ampoule at the midday meal produces a method improvement in memory and capacity to produce ideas, reduces mental fatigue and enables the adult to deal with problems with greater objectiveness.

Levorotatory n-actylaminosuccinic acid and its salts which are prepared in the same manner as the racemic mixture but from L-aminosuccinic acid have equivalent pharmodynamic properties.

What we claim and desire to secure by Letters Patent is:

1. A method of improving mental performance in humans, which consists in administering to humans an effective amount of a pharmaceutical composition containing as an active substance potassium N-acetyl DL aminosuucinate.

2. A method of improving mental performance in humans which consists in administering to humans per os a medicament containing as an active substance potassium N-acetyl DL aminosuccinate, in the form of doses containing from 0.250 gram to 1 gram of said active substance, several doses being administered daily.

3. A method according to claim 2, wherein said doses consist of drinkable ampulla containing said active substance in the form of an aqueous solution.

References Cited

UNITED STATES PATENTS 3,321,369   5/1967   Glasky et al.

ALBERT T. MEYERS, *Primary Examiner.*

S. J. FRIEDMAN, *Assistant Examiner.*